Sept. 19, 1950  F. P. WILLCOX  2,522,698
PHOTOGRAPHIC SHUTTER
Filed Oct. 17, 1946  3 Sheets-Sheet 1
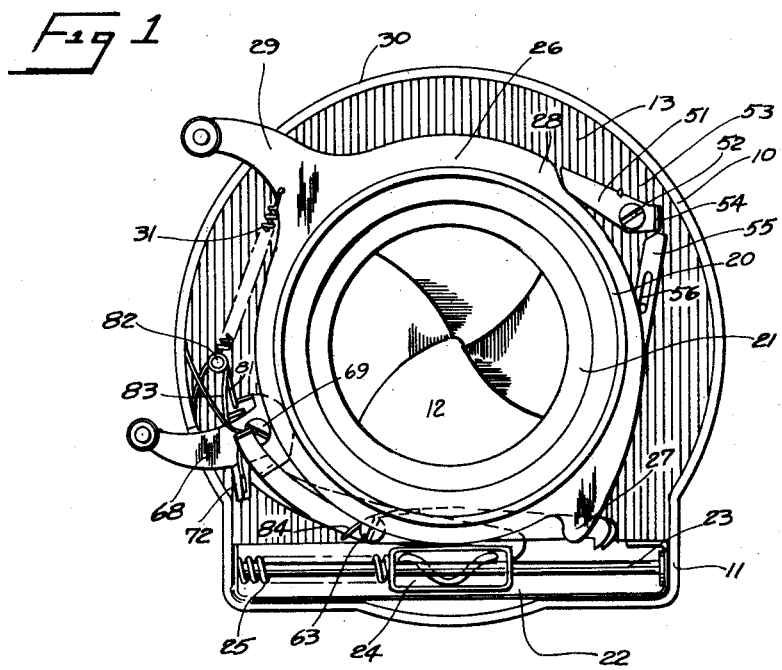
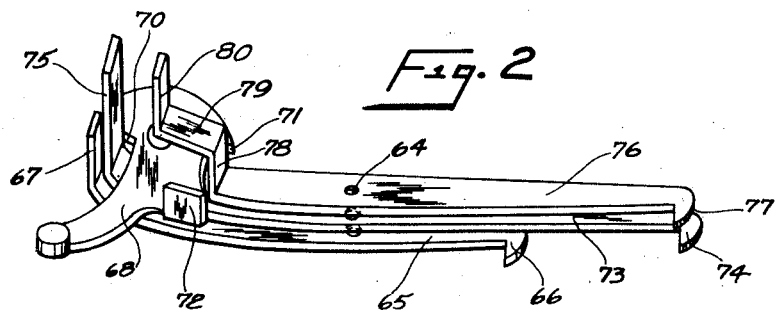
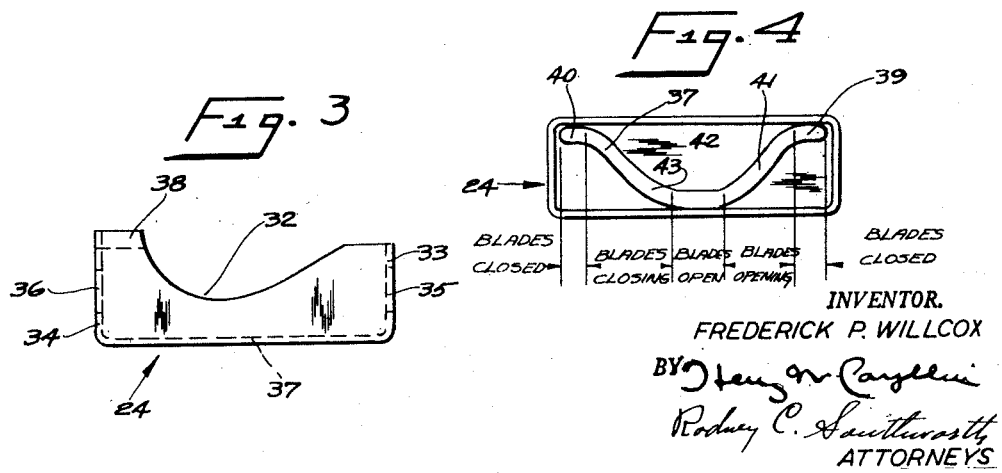
INVENTOR.
FREDERICK P. WILLCOX
BY
ATTORNEYS Sept. 19, 1950  F. P. WILLCOX  2,522,698
PHOTOGRAPHIC SHUTTER
Filed Oct. 17, 1946  3 Sheets-Sheet 2

INVENTOR.
FREDERICK P. WILLCOX
ATTORNEYS

Sept. 19, 1950 F. P. WILLCOX 2,522,698
PHOTOGRAPHIC SHUTTER
Filed Oct. 17, 1946 3 Sheets-Sheet 3
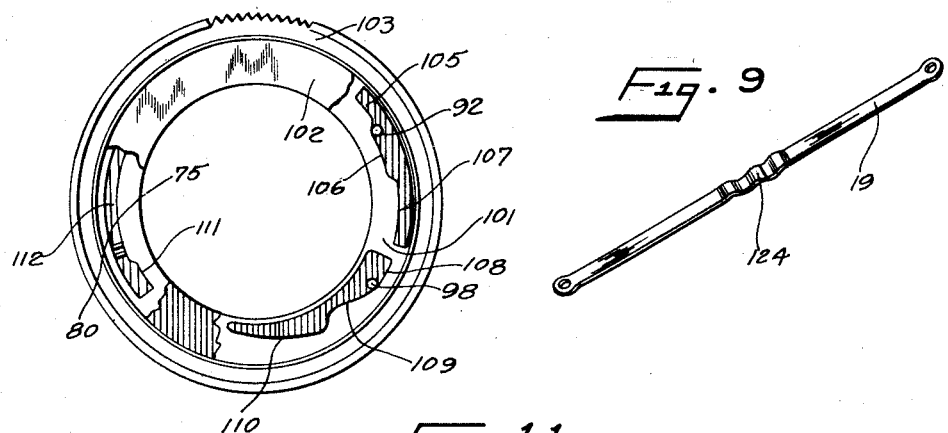
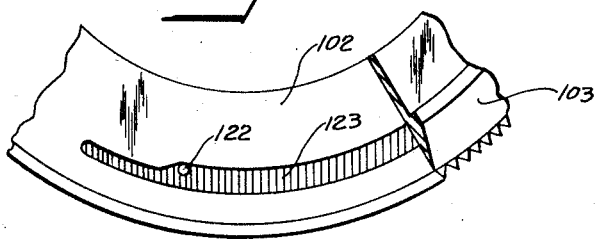
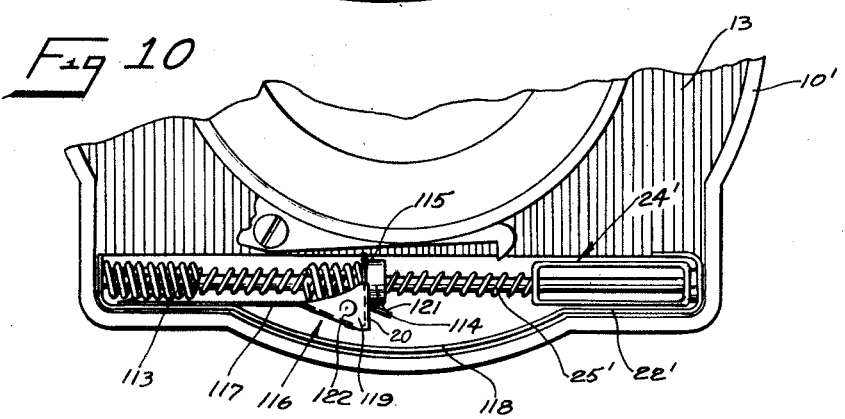
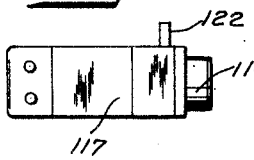
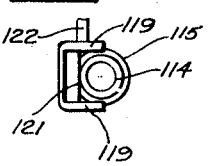
INVENTOR.
FREDERICK P. WILLCOX
BY
ATTORNEYS Patented Sept. 19, 1950

2,522,698

UNITED STATES PATENT OFFICE 2,522,698

PHOTOGRAPHIC SHUTTER

Frederick P. Willcox, Vestal, N. Y., assignor to General Aniline & Film Corporation, New York, N. Y., a corporation of Delaware Application October 17, 1946, Serial No. 703,906

2 Claims. (Cl. 95—63)

This application pertains to an invention in photographic shutters, and more specifically, to a photographic shutter of the so-called between-the-lens type adapted to operate for very rapid exposures and so constructed that its power mechanism functions in a straight line pathway.

Among the objects of the invention is that of devising a shutter which will provide, along with the slower speeds, high speeds substantially greater than any now available in commercial, between-the-lens type shutters.

It is a further object to devise such a shutter which shall have a minimum mass for those parts which move during exposure, and in which the construction shall be greatly simplified and its manufacture and assembly facilitated by the employment of power mechanism movable in a straight or right line pathway.

It is a further object to devise such a shutter in which the master element shall cause the blades to be opened and closed by a cam mechanism, the cam pathway of which follows a constantly accelerated and a constantly decelerated curve both in the opening and closing phases.

It is a further object to devise a shutter of this type in which the blades shall be opened and closed by a cam as above stated and in which all parts shall be simple in design and construction, yet in which the movement shall be effective and efficient in combination with extreme ruggedness and dependability of operation.

It is a further object to provide in such a shutter a right line movement for the master member and other parts of the power or master mechanism in which a supplemental spring may be brought into play by mechanism selectively operable at the higher shutter speeds.

A further object of the invention is that of providing blade interconnecting means adjustable at assembly and at desired times thereafter for synchronizing the positions and movement of each of the blades during opening and closing thereof and for taking up any slack due to wear after a period of use.

It is a further object of the invention to employ very thin blades and to reenforce those blades at their pivotal points so as to provide adequate strength and resistance to wear after repeated use without materially adding to the inertia to be overcome as the shutter functions in opening and closing the blades.

It is a further object of the invention to devise a shutter mechanism in which the blades shall be controlled positively throughout the entire cycle of movement and to prevent rebound at the end of the stroke, both at the end of the opening and the closing movements.

It is a further object of the invention to devise means whereby the master member shall be checked during bulb exposures thereby to prevent undue strain on the operating and control mechanisms.

It is a further object to construct a compact shutter of the type described in which the actual operation shall conform to the best theoretical mode of functioning, by designing the cam action so that it shall combine with the lowering of spring tension during release, friction and inertia forces, to bring about that desired end.

A further object is that of providing for the retard mechanism a resilient construction by which the shock of the first contact between the moving shutter mechanism and the retard means is absorbed.

Another object of the invention is that of providing means to prevent undesired opening of the shutter blades as the power mechanism is primed or cocked.

Other objects will become apparent as the description proceeds.

The invention is herein described and illustrated as applied to a between-the-lens type shutter in which the master member is set prior to exposure and wherein release is effected by the usual trigger or by remote control means which may be interconnected for operation on a trigger or the like. Such a shutter is of the symmetrical opening type and may employ any suitable number of blades from three to a greater number depending upon the size, cost, and other factors. The entire mechanism is housed within a casing of general annular shape and comprises a priming or cocking means, blades, blade interconnecting and operating mechanism, a master member including a rectilinearly movable cam and a power means such as a spring to impart the motion through the cam to the blades. The power or master mechanism is engageable by mechanism by which it may be controlled to determine the type of exposure, for example, instantaneous, bulb, or time exposures. The duration of exposure is controlled by a train of gears, a sector gear and a pallet, the function of which and the specific mode of operation of which will be more clearly described in later paragraphs.

As the master member is moved to cocked position, there would be, if special provision were not made, an undesired opening and closing of the blades. Mechanism later to be described is provided for preventing such undesired exposure at that time. The details of the above-mentioned mechanism will be more thoroughly described by reference to the accompanying figures of drawing, wherein like parts are indicated by similar reference numerals and wherein:

Fig. 1 is a view showing parts of the shutter with the front of the casing removed.

Fig. 2 is a perspective view, slightly exploded, showing the instantaneous, bulb and time levers and the trigger.

Figs. 3 and 4 are detail views of the master member.

Fig. 8 is a detail of the cam pathways for the speed setting ring.

Fig. 9 is a detail of one link of the blade interconnecting means.

Fig. 10 is a view showing a modification in which a supplemental spring is employed for actuating the master member.

Fig. 11 shows a speed setting ring for use with that modification in which a supplemental spring is employed.

Figs. 12 and 13 are details of the control mechanism for selectively employing the supplemental spring of Fig. 10.

Now referring to Fig. 1, the shutter is housed within a casing which includes a generally cylindrical outer member 10 which is rectangularly formed at its lower side by the projecting angular parts 11. The power mechanism is housed at the said lower or rectangular portion of the casing and, in the interest of conserving space, the general circular form of the casing is thus modified. However, if desired, a slightly bigger casing of circular outline might be employed, thereby simplifying the pressing of the casing but sacrificing in the size thereof.

Figure 7:
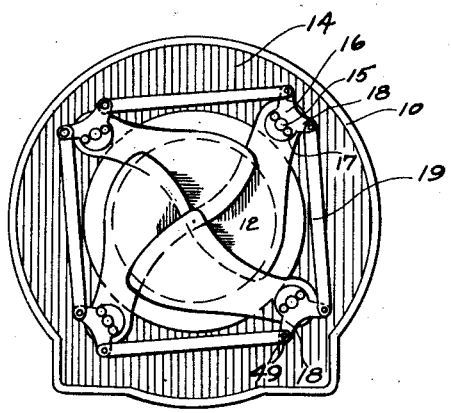
Fig. 7 is a view showing the blade interconnecting and operating means.

A plurality of shutter blades 12 are pivoted as shown more clearly in Fig. 7, the blades herein numbering four, but it is to be understood that any suitable number may be employed. These blades are positioned behind a transverse wall 13 and in front of the rear wall 14 as is the usual custom. Each of the blades is pivoted at a point 15 and is preferably of extremely thin sheet material thereby to cut down the mass and keep inertia forces as low as practicable. To strengen the blades at their pivotal areas, a plate designated by numeral 16 is riveted thereto by the rivets 17, or is connected to the blade in any other satisfactory manner. Each of these reenforcing plates has two projecting arms 18 by which the blade is caused to swing about its pivot 15 for opening and closing it and these arms are in turn interconnected by links 19, the number of which will naturally correspond to the number of blades. These links will be described in greater detail as the disclosure progresses. While the general arrangement for interconnecting blades is not novel in this case and may be observed in United States Patent No. 1,626,032, it is believed that the links by means of which the blades are interconnected for actuation are novel per se and that the method by which these links may be initially adjusted as to length and by which later adjustments may be made to take up for possible wear is new and described herein for the first time.

At the center of the shutter assembly, the annular space within the casing is defined by the cylindrical ring or wall 20 within which is the usual lens carrying or mounting member 21, that being conventional and, therefore, forming no part of the present invention.

The power mechanism housed within the casing and positioned by the lower somewhat rectangular part thereof includes a sheet metal retaining member 22 between the ends of which is fixed a spindle or guide-rod 23 along which may slide freely the master member generally designated by numeral 24. The spindle also carries the power member or spring 25. It is to be understood that the spring 25 is considerably longer than when untensioned and that there is considerably initial tension in the spring even before moving the parts to their cocked or primed position.

A ring 26 is freely movable about the inner cylindrical part of the casing 20 and has thereon a nose portion 27, cam 28, and the priming lever 29 which extends through slot 30 to the outside of the casing to be engaged by the operator in the usual manner. A spring 31 normally retains these parts in the position of Fig. 1.

The master member 24 is shown in greater detail in Figs. 3 and 4 and is preferably formed by pressing sheet material to a rectangular box-like structure cut away as at 32 at its sides for the purpose of lightening the structure. The end portions 33 and 34 have therein circular openings 35 and 36 which are a working or sliding fit on the spindle 23. A cam slot 37 is cut at the back face of the master member and may be divided into four different portions, later to be described in detail. The side material at the point 38 projects forwardly of the spindle 23 to a slightly greater extent than at the opposite end and that top projection 38 serves as a surface against which the nose 27 of the priming member may engage during the priming movement. The retaining member 22 is preferably fixed in the casing member 10 by suitable screws or other attaching means. The attaching wall of the casing 10 is slotted to provide a slight amount of adjustment. When properly adjusted, the retaining screws are tightened down thereby solidly locking the power unit in position. The action of the cam on its follower would naturally give rise to forces tending to rotate the master member about the spindle 23. To prevent such undesired movement, the master member has its back surface (that in which the cam slot is cut) in contact with the cooperating side of the retaining member 22, and since these engaging faces are ground to a suitable bearing, the friction of the parts is not great, while the tendency for rotation above mentioned is prevented.

Now referring to Fig. 4, the cam slot 37 is laid out as shown, the movement from cocked position to released position being understood to be from left to right. The ends of the path which are substantially straight provide for building up a slight momentum prior to opening or closing the shutter and for permitting the elements to come to rest by a short overtravel past the completely closed position. These ends are indicated by the designation "Blades closed," and it is to be understood that at the right hand side of the figure, the pathway 39 maintains the blades closed prior to opening them, assuming the mechanism to be tensioned. The left hand end of the cam pathway designated by numeral 40 holds the blades closed when the mechanism is in its released position. That portion 41 of the cam slot marked "Blades opening" functions to open the blades and this part of the slot first follows a constantly accelerated pathway and then a constantly decelerated pathway. The central portion 42 of the pathway designated by the term "Blades open" is substantially straight and merely functions to hold the blades in open position for that period of time necessary depending upon the speed at which the shutter is set. The following portion 43 marked "Blades closing" corresponds to the "Blades opening" portion except that it is more or less a reversal thereof, the first portion following a constantly accelerated curve and the second a constantly decelerated curve after which the blades remain closed as the short straight portion of the pathway 40 governs.

The terms "constantly accelerated" and "constantly decelerated" have been used and the cam path has been calculated to give that desired type of motion for the blades. Since friction and inertia of the parts as well as the fact that the spring naturally loses tension as the master member moves to the right, Fig. 1, are to be considered, the actual curvature of the cam path is not a theoretically perfect one. The above-mentioned factors are taken into consideration and the blades themselves are opened as nearly as practicable with the desired constant acceleration and are closed with nearly a constantly decelerating motion. Of course, with the number of variables which must be considered, no particular shutter can be expected to function with the theoretically precise movement. That movement is approached as nearly as possible under the circumstances.

Now referring to Figs. 1, 4, 6, 6a, and 7, the blade mechanism is caused to pass through its cycle of movement under the influence of a pivoted plate or lever 44 capable of being swung about a pivot pin 45 by the action of the cam slot 37 which engages a projecting pin or follower 46. The plate 44 has pivoted thereto at 47 a link 48 which in turn engages a pin 49 which is a special one of the pins by means of which one of the links 19 is connected to its arm 18. A spring 50 tends to swing the link 48 in a direction so that it will engage the pin 49, although the same may be intentionally disengaged therefrom since the pin enters a slot at the top of the link. Such disengagement is effected each time the master member is moved to cocked position in a manner hereinafter to be described. The pin 49 extends through wall 13 to engage the cam slot.

Figure 6:
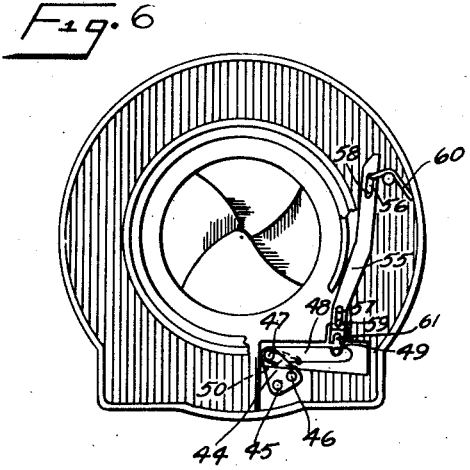
Fig. 6 is a detail view of the disconnecting means which functions when the shutter is primed.

The priming ring 26 has a cam 28, Fig. 1, which engages one end of a short lever 51 pivoted at 52. A spring 53 tends to keep the cam engaging end of the lever down against the ring 26. The opposite end of lever 51 is bent angularly as at 54 and engages the top end of a more or less vertically disposed bar 55 which is slidable as provided by the slots 56 and 57 which engage about the pins 58 and 59. A spring 60 tends to maintain the bar in its uppermost position. The first slight angular movement of the priming lever 29 causes the cam 28 to lift the cooperating end of lever 51 thereby to push downwardly the bar 55 so that the lowermost end thereof which is forked as at 61, will engage the top of link 48 and push it down against the tension of the spring 50. That initial movement takes place just before the nose 27 projecting from the priming ring 26 engages the projecting abutment 38 of the master member. At that time, the forked end 61, the pin 49, and the notch 62 in the link 48 are all in alignment as shown in Fig. 6. As the link 48 is pushed down so that notch 62 is disengaged from pin 49, the nose of the priming means engages and then moves the master member to the left, Fig. 1, the cam therein causing the link 48 to move to the right as in Fig. 6a and then back to its initial position when the master member has become latched in its fully cocked position. At that time, the priming lever 29 is released and the spring 31 will naturally return it to its initial position. The lever 51 drops from cam 28 and bar 55 rises to disengage the link 48 and to permit reengagement of the notch 62 with pin 48. The mechanism just above described prevents unintended opening and closing of the shutter blades during the cocking movement.

Now referring to Figs. 1 and 2, a series of latching levers is provided, these levers being pivoted at 63 on a suitable pivot means which passes through the holes 64 located about at the center of these levers. The lowermost or shortest ones of these levers designated at 65 is provided with a latching or hooked end 66, and at its opposite end has a turned-up or angularly projecting extension 67. This lever controls the master member 24 for instantaneous exposures, and also, in connection with the other levers, provides for the initial release during bulb and time exposures. A trigger 68 is pivoted at 69 and comprises a more or less extended portion adjacent the pivot from which project the shoulders or lever engaging portions 70 and 71. The usual manually engageable trigger extends through the case 10 and serves to release the shutter. A flat angularly disposed plate member 72 provides for shutter release by a cable.

The second or time lever 73 has a latch 74 and at its opposite end an upturned angular projection 75 of greater length than the projection 67. The topmost lever 76 which is the bulb lever has a corresponding latch 77, an angular projection 78 for engagement by the shoulder 71, then a short parallel portion 79 terminating in the projection 80 of similar length to and extending parallel to the projection 75.

The shoulders 70 and 71 on the trigger engage against the extensions 67 and 75 for shoulder 70, and against extension 78 for shoulder 71. The projection 80 and the outer end of projection 75, as will hereinafter be described, are engaged by a cam in the speed setting ring by means of which the instantaneous, bulb, and time exposures are set. Of course, the extension 67 is always engaged by the shoulder 70 and release of the master member is always first effected by the lever 65. During the cocking movement, the nose 27 moves the master member 24 to the left slightly farther than is necessary for engagement of the latch 66 with that master member. A spring 81 coiled about the stud 82 to which the spring 81 attaches bears against the extension 67 so that the lever 65 always tends to remain in a position to keep the master member latched as shown in Fig. 1.

The time lever 73 is also urged by means of a spring 83 to a latching position except as that lever is retained in inactive position by mechanism hereinafter to be described. Similarly, a spring 84 urges time lever 76 to a latching position except as retained in inactive position in a manner similar to that employed for the lever 73.

Figure 5:
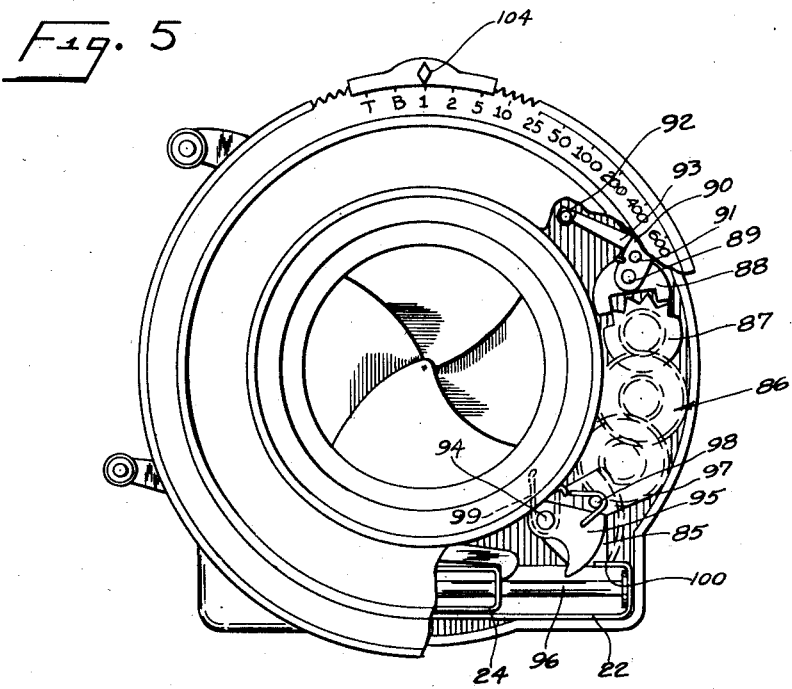
Fig. 5 is a view similar to Fig. 1 but showing only part of the face of the shutter broken away and including the retarding mechanism which has not been shown in Fig. 1.

Now referring to Fig. 5, the retarding mechanism will be described. This retarding mechanism comprises a sector gear 85, a series of intermeshing gears and pinions generally designated by numeral 86, driven from the sector gear and driving at the end of the train a star wheel 87. The star wheel 87 is engaged by a pallet 88 pivoted at 89 at one end of a two-armed lever 90 pivoted at 91 and having a projecting pin 92 at the end of the opposite lever arm for engagement with a cam pathway in the speed setting ring. A spring 93 is coiled about the pivot 91, engages one of the lever arms and a fixed point in the casing thereby to bias the assembly in such direction that the pallet will normally engage the star wheel.

Sector gear 85 is pivoted at 94 and rather than permit the sector itself to contact the master member, the sector is, in effect, resiliently constructed as a two-part member, one of which engages the master member to impart motion derived therefrom to the sector through a resilient means. The resiliently connected contact element 95 is also pivoted at 94 and has a projecting nose 96 which, when desired, is engaged by the master member 24. This member 95 imparts its motion to the sector gear 85 through a spring 97 coiled about a grooved pin 98 and projecting downwardly at each end into an appropriate hole, one in the sector gear and the other in the member 95. A spring 99 coiled about the pivot 94 engages the sector gear at a fixed surface in the casing to urge the sector gear assembly in a clockwise direction or in such direction that it would tend to be engaged by the master member at an early point in the travel of the latter. The retaining casing 22 is folded inwardly adjacent the sector gear as at 100 and serves as a stop for the gear 85 and member 95 as they are moved in the clockwise direction under the influence of spring 99.

Now referring to Fig. 8, the speed setting ring is shown at 101 it being understood that most of that ring lies behind the front face 102 of the shutter casing. Outside that face 102 may be rotated the outer portion 103 of the speed setting ring which is serrated as is the usual practice and on which are the usual graduations including the time and bulb setting marks and the speed indications from 1 second to 1/600 of a second, or such other indicia as may be applicable to the particular shutter to which the invention is applied. These speed indications are set opposite an index or fiducial mark on a plate 104, Fig. 5.

At the right hand side of the speed setting ring, Fig. 8, is a cam slot having the inner surface thereof defined as a cam pathway against which the pin or follower 92 on the pallet withdrawing means bears. The first part of this cam pathway designated by numeral 105 removes the pallet from engagement with the star wheel for time and bulb exposures. The second or depressed part of the pathway 106 permits the pallet to move into engagement with the star wheel for the lower shutter speeds, for example, for speeds of one full second to 1/5 of a second. The remainder of the pathway at 107 causes the withdrawal of the pallet for higher shutter speeds, e. g., 1/25 of a second to the maximum.

The next cam pathway serves to control the position of the sector gear 85 and, of course, the position of the nose 96 of the attached, resiliently mounted contact element 95. The pin 98 projects sufficiently far beyond the operating mechanism to extend into the controlling slot in the cam ring and bears against a cam surface at the outer part of that slot. While the pallet is withdrawn during time and bulb exposures, the remainder of the retarding mechanism is permitted to exert its full effect upon the master member for the purpose of absorbing some of the energy built up during the initial movement of that member after its release by the lever 65 and before it is stopped by the bulb lever 76. The position of the parts is such that the master member 24 engages the projection or nose 96 and is retarded in its movement as the retarding train runs practically throughout its maximum extent of travel prior to engagement of the master member by the latch 77. That lessens the shock on the mechanism during time and bulb exposures. The part of the pathway designated by numeral 108 permits the full effect of the train to be exerted at that time.

For the slower instantaneous speeds, the pallet is brought into engagement and the cam surface 109 properly positions the sector gear and train so that the requisite amount of retarding influence will be exerted. For the faster speeds, the pallet is again withdrawn and all control, if any, is exercised through the gear train itself the position of which is determined by the cam surface 110.

The position of the time and bulb levers is controlled by the third cam slot in the speed ring and the inner portion of that slot governs the first or depressed part 111 permitting the levers 73 or 76, or both of them, to drop to a position in which they may engage the master member. For a bulb exposure the projection 80 drops to the surface 111, thereby permitting lever 76 to swing to a position in which the latch 77 may engage and stop the master member as the blades reach their open position. For time exposures, the speed setting ring is moved to the limit of its clockwise travel so that both projections 75 and 80 drop to that surface 111. For all instantaneous exposures, both levers are withdrawn and, therefore, both projections ride upon the cam pathway 112.

Referring more specifically to Figs. 10, 12, and 13, a modification of the invention is shown in which a supplemental spring comes into action for higher or faster shutter speeds. Like numerals with primes are employed for the parts of the shutter which correspond to similar parts above described with respect to the preferred form thereof. In addition to the parts previously described, there are provided the supplemental spring 113, a spring retaining cup 114 having a flange 115, and a latch member 116. This latch member is shown in greater detail in Figs. 12 and 13 and includes a flat spring arm 117 riveted to the retaining member 22 which is curved outwardly to provide additional space as at 118. The latch 116 has the side pieces 119 and a front wall 120 which is inwardly bent to engage the flange 115 on the cup 114. The side wall 120 is bent to extend forwardly and downwardly at 121, thereby providing a ramp for deflecting the latch downwardly to permit latching engagement of the flange cup as shown in Fig. 10. When the supplemental spring is to be employed, the latch is moved to disengaged position by contact of a pin 122 with a cam slot in the speed setting ring.

The springs 113 and 25' are wound in reverse directions so as to prevent interference between the coils thereof. The cup 114 slides freely along the outer surface of spring 25' and the initial tension in the spring 113 is such that it exerts considerable force even when the cup 114 bears against the master member 24' in its right hand position, Fig. 10.

The pin 122 engages within a cam slot 123 which is actually cut in the lower or inner surface of the speed setting ring 102, and more specifically, at the outermost or graduated portion 103 thereof. The major portion of the cam slot 123 permits the latch 116 to engage the cup 114 and thereby hold the supplemental spring in its inactive position. At that time, the shutter may be cocked and will function under the tension of the spring 25' just as described with respect to the first-mentioned form of the invention. For speeds from $1/200$ to $1/600$ of a second, for example, the position of the speed setting ring is such that the left hand end of the cam causes the pin 122 to withdraw the latch from the cup thereby releasing it. Then, upon release, the master member is caused to move by the combined tension of both springs. Upon the first cocking movement after a release of the spring 113, and upon setting the speed ring at a lower shutter speed, the spring will be latched in active position. Speeds may also be changed so as to release the supplemental spring for action after the shutter is cocked, or after cocking the shutter at a higher speed, the speed ring may be rotated to release the latch 116 whereupon the cup 114 will be held and the spring rendered ineffective.

Now referring to Fig. 9, a connecting link 19 is shown in detail. This connecting link has been bent to form a series of waves 124 for the purpose of shortening the link and effecting an adjustment thereof, and consequently, an adjustment of the blades, the position of which is governed by the links. A tool having complementary surfaces which are pressed together against the sides of the link serves to form the waves 124 and the extent by which the link itself is shortened may be varied by the degree of bending effected by the tool. This adjustment is of use as the mechanism is initially assembled, and, of course, is resorted to thereafter for correcting any lack of synchronization between the various shutter members and for taking up for lost motion due to wear or other causes. This method of adjustment and the design of the links themselves makes it unnecessary to work to close limits in forming the links or in positioning the plates 16 and their arms 18 with respect to the blades 12, Fig. 7.

Operation

The shutter is set for making an exposure by first setting the speed ring at the particular speed and type of exposure desired. For example, the ring may be set at an instaneous exposure from one full second to $1/600$ of a second for the particular shutter illustrated. The pallet and the position of the sector gear 85 will be adjusted according to the time of the exposure and, since it is to be an instantaneous one, the cam pathway 112, Fig. 8, will have moved both the levers 73 and 76 to a position in which they have no effect upon the master member 24.

The shutter is cocked by moving the projecting lever 29 clockwise as far as it will go thereby moving the master member to the left, Fig. 1, to be latched by the instantaneous lever 65. Release by pressing downwardly on the trigger 68 will engage shoulder 70 with extension 67 and will withdraw latch 66 from in front of the master member. The spring 25 will then move the master member to the right first opening the shutter blades, then engaging the retard mechanism to time the exposure (except at the fastest speed) and thereafter closing the blades. The position of the retard mechanism and of the pallet 88 determines the duration for which the blades remain open or the amount of time it takes for the master member 24 to move the extent of the flat portion 42 of cam 37. For the fastest exposure, no contact between the master member and the nose 96 of the resiliently connected blade 95 is permitted.

If the modification shown in Fig. 10 is to be employed, the setting of the speed will involve selective employment of the supplemental spring 113 for the higher speeds.

For a bulb exposure, the speed ring is set with the letter "B" opposite the index and at that time the pallet is withdrawn and the retarding train is set to exert its greatest retarding influence on the master member. The position of the speed setting ring is such that the lever 76 is permitted to drop to a position to stop the master member before the shutter blades start to close. At that time, the projection 80 will have dropped to the lower pathway 111 of the cam, Fig. 8. The mechanism is set as before, and upon release by pushing down on trigger 86, the latch 66 is withdrawn permitting movement of the master member to the right until it is stopped in mid-position by latch 77 on the bulb lever. The retarding means functions to slow up the movement of the master member just before it is stopped by the latch 77 thereby absorbing some of the shock which would otherwise have to be taken by that mechanism. The blades remain open so long as the trigger is held down but upon release thereof, the spring by which it is returned to initial position will cause the trigger to move clockwise and the shoulder 71 to engage the portions 78 of lever 76 thereby to withdraw the latch 77 and permit the master member to complete its movement thereby closing the blades.

For a time exposure, the mechanism is appropriately set so that both the projections 75 and 80 drop to the cam edge 111 thereby to permit both the time and bulb levers 73 and 76 to move to a position for latching the master member. The retarding train is likewise set in its fully effective position. The mechanism is cocked as before and upon release the master member moves to that point where it stops against the latch 77 as for a bulb exposure. The trigger 68 may then be released whereupon the bulb lever is withdrawn permitting the master member to move a slight distance until it is again engaged and stopped by the time lever. A second movement of the trigger brings shoulder 70 into contact with projection 75 for withdrawing the latch 74 and permitting the termination of the exposure by further movement of the master member to the right.

Conclusion

Figure 6A:
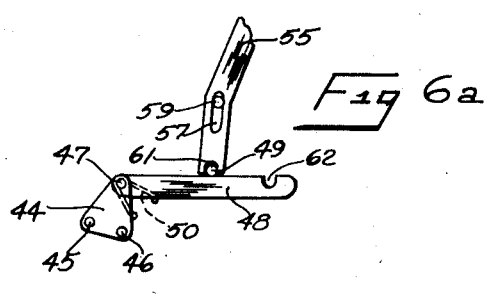
Fig. 6a is an enlarged detail of part of the mechanism of Fig. 6.

The invention has been described by reference to a preferred embodiment thereof, but changes may be effected, such, for example, as that of substituting for the levers 18 and the connecting links 19, other mechanism which might take the form of the more conventional blade ring having a projection such as the projection 49 which might engage within a notch in the link 48, Fig. 6a. Then actuation of the link by mechanism as herein described would impart motion through the blade ring to the blades.

The master member has been illustrated here as slidable on a spindle and as being guided by one face of the retaining member in which the master member and power mechanism are held. Obviously, variations may be resorted to and other means for guiding the elements in their sliding movement along a straight line may be employed. In some shutters the movement of the master member may be in other than a horizontal direction and its force may be applied at some other point about the shutter mechanism. While coil type compression springs have been described and illustrated here, the master member may be moved by similar springs under tension, or may be affected by other means for imparting the power impulse necessary.

While one form and a modification of the invention have been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a camera shutter of the type described, the combination of a casing, a plurality of shutter blades movable to and from open and closed positions to effect an exposure, means interconnected to said blades and angularly movable for imparting the said opening and closing movements to the blades, and means engageable with said means interconnected to the blades for imparting the said angular movements to it which includes a master member having therein a cam means comprising opening and closing portions between which is a dwell, said opening portion following a constant acceleration and then a constant deceleration curve and said closing portion following similar constant acceleration and deceleration curves, means upon which said master member is moved in a right line pathway, a power means to urge said master member in one direction, said power means comprising springs, one telescoped within the other, and latch means by which the outermost of said springs may be selectively retained in an inactive position, a latch means to hold the master member in primed position and a trigger for releasing said latch means.

2. In a camera shutter of the type described, the combination of a casing, a plurality of shutter blades movable to and from open and closed positions to effect an exposure, means interconnected to said blades and angularly movable for imparting the said opening and closing movements to the blades, and means engageable with said means interconnected to the blades for imparting the said angular movements to it which includes a master member having therein a cam means comprising opening and closing portions between which is a dwell, said opening portion following a constant acceleration and then a constant deceleration curve and said closing portion following similar constant acceleration and deceleration curves, means upon which said master member is moved in a right line pathway, a power means to urge said master member in one direction comprising a spring under compression for biasing said master member in one direction, a second spring telescoped about the first said spring and similarly under compression for biasing said master member, a spring retaining means and a latch member adapted in one position to engage said spring retaining means and to hold said second spring in a compressed, inactive position thereby to permit actuation of said master member by the first-mentioned spring only, and means for disengaging said latching means thereby to permit said second spring to engage said master member and, upon cocking said master member and releasing it, to exert its force thereon in addition to that of the first spring, a latch means to hold said master member in primed position, and a trigger for releasing said latch means.

FREDERICK P. WILLCOX.

REFERENCES CITED

The following references are of record in the file of this patent:

UNITED STATES PATENTS

| Number | Name | Date |
|---|---|---|
| 444,083 | Bausch et al. | Jan. 6, 1891 |
| 607,242 | Huff et al. | July 12, 1898 |
| 1,626,032 | Fairchild | Apr. 26, 1927 |
| 1,861,257 | Barenyi | May 31, 1932 |
| 2,269,400 | Steiner | Jan. 6, 1942 |
| 2,302,401 | Strassenburg | Nov. 17, 1942 |
| 2,326,077 | Steiner | Aug. 3, 1943 |
| 2,362,546 | Fuerst | Nov. 14, 1944 |
| 2,371,072 | Simmon et al. | Mar. 6, 1945 |
| 2,382,624 | Fuerst | Aug. 14, 1945 |
| 2,397,546 | Harris | Apr. 2, 1946 |
| 2,398,567 | Transfors | Apr. 16, 1946 |

FOREIGN PATENTS

| Number | Country | Date |
|---|---|---|
| 686,453 | France | Apr. 14, 1930 |